Oct. 14, 1958  T. R. ISBISTER  2,855,638
WEATHER STRIP FOR DOORS
Filed April 20, 1956  2 Sheets-Sheet 1

Inventor
THOMAS R. ISBISTER
by J. Richard Cavanagh

Inventor
THOMAS R. ISBISTER

United States Patent Office 2,855,638
Patented Oct. 14, 1958

2,855,638

WEATHER STRIP FOR DOORS

Thomas Robertson Isbister, Toronto, Ontario, Canada

Application April 20, 1956, Serial No. 579,576

1 Claim. (Cl. 20—67)

This invention relates to a weather strip for doors.

Former door weather strips of the hinged type are provided in the form of a conventional mechanical hinge carrying an elastomer sealing strip or in the form of an elastomer strip which itself is wholly swingable to and from a sealing position. A mechanical hinge of conventional form having a central shaft freezes readily, particularly at sub-zero temperatures and is therefore rendered inoperative and impractical of use in many localities. Where the device depends upon the elastic nature of the sealing strip to yield in a hinge-like function, the material of the sealing body presents lesser qualities of elastic recovery, i. e., lesser springiness as temperatures drop below freezing. While such lesser elastic recovery does not critically affect the sealing qualities of the sealing edge of such a strip, the flexibility of the body thereof suffers to such a degree as to render such devices impractical of use at sub-zero temperatures. Moreover, the flexibility of such devices suffers greatly from normal weathering.

It is therefore an object of the invention to provide a sealing strip for doors adapted in particular for sub-zero service and effectively operative in a wide range of weather conditions.

It is another object of the invention to provide a weather strip for doors having a novel fulcrum or hinge-like construction serviceable under a variety of weather conditions and substantially self-enclosed.

It is a further object of the invention to provide a weather strip for a door threshold which is adapted to be provided in cheap but sturdy construction and which embodies an easily replaceable sealing element.

Other objects of the invention will be appreciated by a study of the following specification, taken in conjunction with the accompanying drawings.

Figure 1:
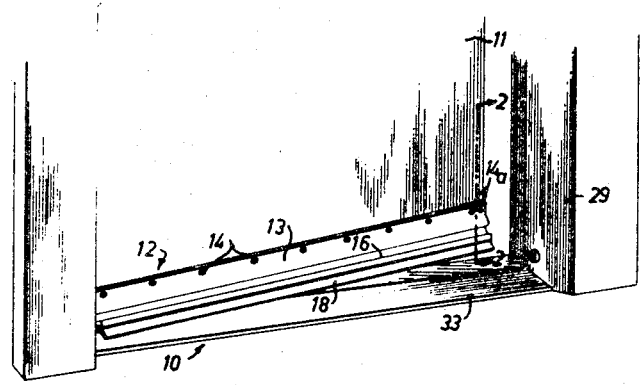
Figure 1 is a perspective view of a door threshold showing the sealing strip of the invention mounted on the door with the door slightly ajar.

In the drawings, the threshold 10 having a door 11 hinged thereover, is adapted to be sealed by a sealing strip device 12 of the invention. The device 12 comprises the extruded rigid body or bracket 13 fastened by suitable screws 14 to the door 11 and having an inturned enclosing lip 15 of predetermined radius as hereinafter described in more detail. The sealing arm 16 is likewise of extruded form and carries at the free end 17, a rubber or other elastomer sealing member 18 having an enlarged bead or locking flange 19 therein adapted to be gripped within the socket portion 20 of the arm. The fulcrum end 21 of the arm 16 is defined by a forwardly curved flange or lip 22 adapted to seat within the lip 15 and having associated therewith, the shoulder 23 carrying the abutment surface 24.

The co-operating lips of the body and swingable arm are brought into assembly by longitudinal insertion. By reason of the geometry of the structure, the outwardly curved flange 22 defining the lip 21 of the arm 16 cannot be hooked into assembly with the depending lip 15 of the body 13. Accordingly, once assembled, the arm and body components cannot be separated by way of hinging action but must be separated by sliding one out of the other by way of longitudinal motion. Therefore, the hinge or fulcrum construction effected is essentially self-retaining but is nevertheless relatively free within the limits of motion indicated in Figures 2 and 3.

Figure 2:
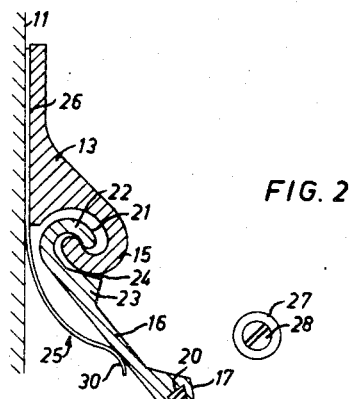
Figure 2 is a sectional view of the sealing strip of Figure 1 on the line 2—2 thereof.
Figure 4:
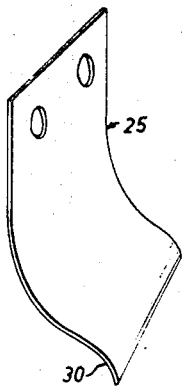
Figure 4 is a perspective view of a spring element serving as biasing means for the weather strip device of the invention.

In Figure 2, the biasing means 25 shown in the form of a leaf spring also in Figure 4, is held in assembly with the mounting surface 26 of the body 13 by screws 14a and normally biases the arm 16 outwardly to the position shown in this figure determined by engagement of the engaging surface 24 with the outer surfaces of the lip 15 and corresponding engagement of the lip 21 with the inner surfaces of the lip 15. The arm 16 is swung to the substantially vertical or closed position by engagement with a stud 27 fastened as by a screw 28 to the door jamb 29 as shown in Figure 1 as the door is brought to a position of closure.

Figure 3:
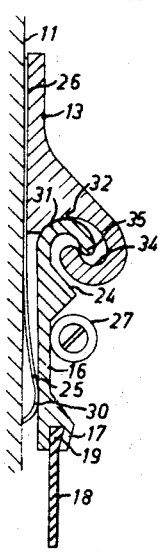
Figure 3 is a view illustrating the closed position of the components of the sealing strip of the invention being a different operational view corresponding to that of Figure 2.

Thus, in Figure 3, the arm 16 is shown in a substantially vertical position as engaged by the stud 27, further swinging motion being limited by the free inturned end 30 of the spring 25 and by engagement of the outer surfaces of the arm lip 21 as at 31, with the confining inner contour surfaces 32 of the body lip 15. Engagement of the sealing member 18 with the threshold member 33 of the threshold is not shown in Figure 3 because it is intended that this figure illustrate a limiting condition which will not ordinarily occur in the use of the weather strip device of the invention. It will be observed in this figure that the arm 16 has been raised from a normal fulcrum-like action within the inner channel 34 defined by the inner surfaces of the body lip 15 and has been raised into engagement with the surfaces 32 of the body. These surfaces, however, are sufficiently close that the outward edge or terminus 35 of the arm lip 21 is still within the channel 34. It will be realized, therefore, that in the closed position, some vertical movement may be possible in the fulcrum construction of the invention while the assembly of the components is still maintained. Accordingly, an attempt to force the door shut with a small obstruction under the sealing member 18 will not result in damage to the components by reason of the limited amount of freedom or "play" provided in the fulcrum structure.

Figure 5:
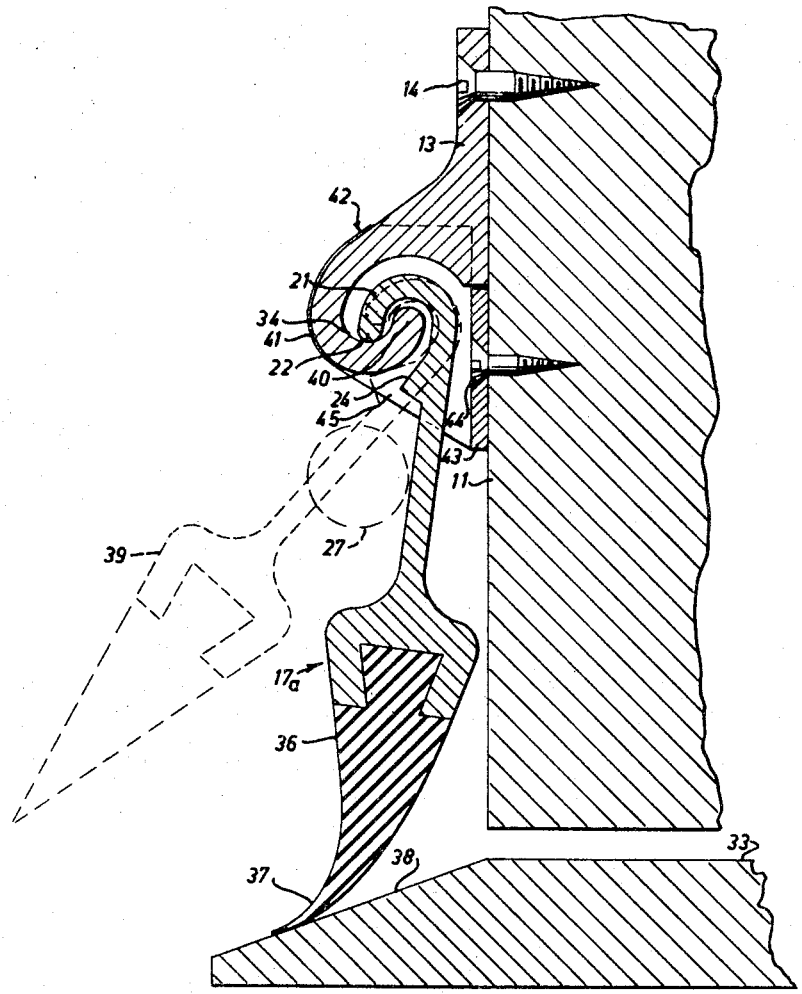
Figure 5 is an enlarged sectional view of a modified form of sealing device of the invention illustrating the same in the closed position and showing in dotted lines, the normally free outwardly biased position thereof.

A modified form of construction is shown in Figure 5 wherein a light but highly effective seal is accomplished without giving rise to undue wear on the sealing means. The bracket or body and the fulcrumed arm are of the same geometric form but in this case, free end 17a of the arm embodies a tapered sealing member 36 effecting a pliable sealing flange portion 37 adapted to form an effective seal against the inclined surface 38 of the threshold member 33 whereby substantially the weight of the fulcrumed arm alone will effect a sufficient seal and the outwardly directed lip 21 thereof in its terminus or fulcrum edge 22 will remain substantially in engagement with the channel 34 of the bracket 13. As before described, the arm 16 in its outward position, accomplishes a limiting position indicated in chain lines as at 39 whereby the inturned terminal portion 40 of the inturned lip 41 becomes engaged between the inner surface of the fulcrum lip 21 and the engaging surface 24 of the arm 16.

In order to accomplish the fulcrum hinge construction described, the inner surface radius of the bracket lip should be substantially equal to the inner surface radius of the arm fulcrum lip. While the thickness of the bracket lip may be slightly greater than the thickness of the fulcrum lip of the arm, both lip thicknesses are substantially equal to the inner surface radii. Each of the lip formations has a curvature defining a hook-like configuration in cross-section extending through more than 180° of arc. In a general sense, the structure comprises extruded components defining in section, co-operating interconnected hook-like portions adapted to permit swinging motion relatively between the components wherein said motion is limited on the one hand by the degree to which one hook formation may be nested, that is, rotated into the other; and on the other hand, by abutment means adapted after a predetermined arc of movement, to engage the outer surfaces of the opposing hook-like formation.

It has been found that the weather strip device of the invention may be provided economically in extruded form. The components are assembled longitudinally after extrusion. The sealing means is mounted in the sealing arm by longitudinally sliding the extruded elastomer sealing member or element into the gripping channel or socket portion 20 on the free end of the sealing arm. The ends of the sealing arm may be crimped to lock the sealing member therein. Relative longitudinal sliding of the arm in the bracket is prevented by end stop brackets 42 as shown in Figure 5. Each end bracket comprises a body 43 adapted to be fastened by a screw 44 to door 11 below bracket 13 and carries a right angular flange 45 substantially covering the end of channel 34. Right and left hand end brackets will be required and are first aligned and mounted on the door before mounting of bracket 13.

It has been found that in the past, a conventional hinge type of construction is adapted to jam or freeze under sleeting and icing conditions, rendering such prior devices relatively ineffective. In cases where a direct hinge construction has been avoided and a simple elastic body employed to form, by reason of its deformable nature, a sort of hinge, weathering has destroyed the resilient effect of the material used for such member and has rendered it ineffective in a relatively short time.

By way of contrast, the construction of the invention does not provide a tight hinge construction and permits freedom in the fulcrum area adapted for free swinging action under icing conditions. Moreover, the inturned lip of the bracket effectively serves as an effectively self-enclosing weather protecting mantle whereby the fulcrum construction may be defined as of the enclosed type protected from driving rain, sleet and the like. The fulcrum construction also is not affected by weathering and may therefore serve for continued use over a substantial period of time. The elastomer sealing element may be replaced readily and may be provided in an extruded, inexpensive form.

While there has been described what is at present considered a preferred embodiment of the present invention, it will be appreciated by those skilled in the art that various changes and modifications can be made therein without departing from the essence of the invention and it is intended to cover herein all such changes and modifications as come within the true spirit and scope of the appended claim.

What I claim as my invention is:

A weather strip adapted to provide a seal between a door and a threshold when the door is in the closed position against the door jamb and comprising in combination: a bracket having a depending inturned lip portion of predetermined length and thickness and presenting an inner surface of predetermined radius, said bracket adapted to be fastened to a door adjacent and substantially parallel to the threshold edge thereof; a swingable arm having an upwardly and forwardly formed lip portion at one end of predetermined length and thickness and presenting an inner surface of predetermined radius, said arm lip portion adapted to be slidably assembled in fulcrum relationship within the depending lip portion of said bracket, the inner surface radius of said inturned lip portion being such as to permit limited upward motion of said arm with respect to said bracket, in conjunction with the lip portions thereof; an elastomer member mounted on said arm; abutment means on said arm extending outwardly therefrom adapted in conjunction with said forwardly formed lip portion to engage said inturned lip portion thereby defining the outward limit of swinging motion of said arm with respect to said bracket and thereby restricting disengagement of said lip portions to a longitudinal relatively slidable action;; and means normally biasing said arm outwardly and upwardly with respect to the threshold edge of the door supporting said bracket.

References Cited in the file of this patent

UNITED STATES PATENTS

| | | |
|---|---|---|
| 437,478 | Capewell et al. | Sept. 30, 1890 |
| 623,917 | Krebs | Apr. 25, 1899 |
| 733,295 | Stites | July 7, 1903 |
| 2,321,730 | Benson | June 15, 1943 |